US010399229B2

(12) United States Patent
Han

(10) Patent No.: US 10,399,229 B2
(45) Date of Patent: Sep. 3, 2019

(54) METHOD OF TRACKING TARGET OBJECT

(71) Applicant: KINPO ELECTRONICS, INC., New Taipei (TW)

(72) Inventor: I-Chun Han, New Taipei (TW)

(73) Assignee: KINPO ELECTRONICS, INC., New Taipei (TW)

( * ) Notice: Subject to any disclaimer, the term of this patent is extended or adjusted under 35 U.S.C. 154(b) by 25 days.

(21) Appl. No.: 15/836,441

(22) Filed: Dec. 8, 2017

(65) Prior Publication Data

US 2018/0370037 A1 Dec. 27, 2018

(30) Foreign Application Priority Data

Jun. 27, 2017 (CN) .......................... 2017 1 0499219

(51) Int. Cl.
| | |
|---|---|
| *B25J 9/16* | (2006.01) |
| *G06K 9/00* | (2006.01) |
| *G06T 7/246* | (2017.01) |
| *G06K 9/32* | (2006.01) |
| *B25J 19/02* | (2006.01) |

(Continued)

(52) U.S. Cl.
CPC ........... *B25J 9/1697* (2013.01); *B25J 9/1664* (2013.01); *B25J 19/023* (2013.01); *G06K 9/00664* (2013.01); *G06K 9/3216* (2013.01); *G06K 9/3241* (2013.01); *G06T 7/12* (2017.01); *G06T 7/13* (2017.01); *G06T 7/248* (2017.01); *G06K 2009/3291* (2013.01)

(58) Field of Classification Search
CPC ...... B25J 9/1697; B25J 9/1664; B25J 19/023; G06T 7/12; G06T 7/248; G06T 7/13; G06K 9/00664; G06K 9/3216; G06K 9/3241; G06K 2009/3291
See application file for complete search history.

(56) References Cited

U.S. PATENT DOCUMENTS

2018/0181137 A1* 6/2018 Choi ................... G05D 1/0246

OTHER PUBLICATIONS

Hu et al. "Reliable Person Following Approach for Mobile Robot in Indoor Environment." International Conference on Machine Learning and Cybernetics, International Conference on Machine Learning and Cybernetics, Jul. 12, 2009, pp. 1815-1821 (Year: 2009).*

(Continued)

*Primary Examiner* — Jon Chang
(74) *Attorney, Agent, or Firm* — Chun-Ming Shih; HDLS IPR Services

(57) ABSTRACT

A method of tracking target object includes following steps of: controlling a following robot to capture a target object for obtaining a comparison image; determining in the comparison image a plurality of sampling particles corresponding to the target object; calculating a predicted position of each sampling particle; moving toward a predicted direction corresponding to the predicted positions for following the target object; re-sampling the sampling particles according to a difference between a reference image and the comparison image; configuring the compare image as the new reference image; and, performing above-mentioned steps repeatedly until the following robot stops following the target object. Therefore, the analysis efficiency and stability of tracking effectively can be improved; the real-time following and the following robot operate without a signal transmitter can be achieved as well.

10 Claims, 14 Drawing Sheets

(51) Int. Cl.
     *G06T 7/13*           (2017.01)
     *G06T 7/12*           (2017.01)

(56) References Cited

OTHER PUBLICATIONS

Yohimi et al. "Development of a Person Following Robot with Vision Based Target Detection." IEEE/RSJ International Conference on Intelligent Robots and Systems, Oct. 9, 2006, pp. 5286-5291 (Year: 2006).*

Hoshino et al. "Human Following Robot based on Control of Particle Distribution with Integrated Range Sensors." IEEE/SICE International Symposium on System Integration (SII), Dec. 20, 2011, pp. 212-217 (Year: 2011).*

* cited by examiner

| 1 | 0 | 1 | 1 | 0 | 1 | 0 | 0 |
|---|---|---|---|---|---|---|---|
| 1 | 1 | 0 | 1 | 0 | 0 | 0 | 0 |
| 1 | 1 | 1 | 0 | 0 | 0 | 0 | 0 |
| 0 | 1 | 0 | 1 | 0 | 1 | 0 | 0 |
| 1 | 1 | 1 | 1 | 1 | 0 | 0 | 0 |
| 0 | 1 | 0 | 1 | 0 | 0 | 0 | 0 |
| 1 | 1 | 1 | 1 | 0 | 1 | 0 | 1 |
| 1 | 0 | 0 | 0 | 0 | 0 | 0 | 0 |

FIG.10

METHOD OF TRACKING TARGET OBJECT

BACKGROUND OF THE INVENTION

Field of the Invention

The technical field relates to method and more particularly related to method of tracking target object.

Description of Related Art

In order to simplify the user's operation of driving, there is a following robot having ability of automatically following the user currently, such as a shopping cart robot or a luggage robot. In order to implement a function of automatically following, the user must wear a signal emitter, such as camera, Bluetooth transceiver or locator, before the following robot of the related art starts to follow the user. Then, the following robot of the related art analyzes the signals received from the signal emitter (such as image captured by the camera, Bluetooth signals sent by the Bluetooth transceiver or position signal sent by locator) for determining the current position of the user. Then, the following robot of the related art determines a following direction according to the current position of the user, and moves toward the following direction for following the user.

When putting the following robot of the related art in use, because the user must wear the signal emitter had paired with the following robot of the related art for implementing the function of automatically following, above status is inconvenience to the user, increases the cost of manufacturing the following robot of the related art, and increases the risk of failing to implementing the function of automatically following caused by losing the signal emitter additionally.

SUMMARY OF THE INVENTION

The present disclosed example is directed to a method of tracking the target object having ability of predicting a moving direction of the target object via computer vision technology and implementing the function of real-time following.

One of the exemplary embodiments, a method of tracking target object for making a following robot follow a target object automatically, comprises following steps: a) capturing a target object for obtaining a comparison image at the following robot; b) determining a plurality of sampling particles corresponding to the target object from the comparison image; c) calculate a predicted position of each sampling particle according to a current position and a current velocity of each sampling particle; d) control the following robot to move toward a predicted direction corresponding to the predicted positions; e) re-sampling the sampling particles according to a difference between a reference image and the comparison image, and configuring the comparison image as the new reference image; and, f) performing the step a) to the step e) repeatedly until the following robot stops following the target object.

One of the exemplary embodiments, the method of tracking target object comprises following steps after step a) and before step b): g1) calculating a body deviation according to the reference image and the comparison image; and, g2) calibrating the comparison image according to the body deviation.

One of the exemplary embodiments, the step g1) comprises: g11) retrieving a reference position of image of a static physical object in the reference image; g12) recognizing a comparison position of image of the static physical object in the comparison image; and, g13) calculating the body deviation according to the reference position and the comparison position.

One of the exemplary embodiments, the method of tracking target object comprises following steps after step a) and before step b): h1) executing a glare mask process to the comparison image for filtering out a glare region in the comparison image; and, h2) executing a shadow mask process to the comparison image for filtering out a shadow region in the comparison image.

One of the exemplary embodiments, the step c) comprises following steps: c1) add a random value to the current velocity as the new current velocity, wherein an initial value of the current velocity is zero; and, c2) calculating the predicted position of each sampling particle according to the current position and the current velocity of each sampling particle and a capture time difference between time of capturing the reference image and time of capturing the comparison image.

One of the exemplary embodiments, the step e) comprises following steps: e1) comparing the reference image with the comparison image, and generating a difference image; e2) calculating each correct probability that each sampling particle belongs to the target object; e3) re-sampling the sampling particles according to the correct probabilities of the sampling particles; and, e4) configuring the comparison image as the new reference image.

One of the exemplary embodiments, the comparison image comprises a plurality of difference pixels, the step e2) comprises following steps: e21) configuring a statistic region of each sampling particle in the difference image according to the current position of each sampling particle; e22) calculating a number of all pixels in each statistic region for obtaining each region pixel amount of each statistic region; e23) calculating a number of the difference pixels in each statistic region for obtaining each region difference pixel amount of each statistic region; and, e24) calculating a ratio of the region difference pixel amount to the region pixel amount region, and making the ratio as the correct probability.

One of the exemplary embodiments, the step e3) comprises following steps: e31) deleting the sampling particle having the low correct probability; and, e32) adding the new sampling particle around the sampling particle having high correct probability.

One of the exemplary embodiments, the step d) comprises following steps: d1) controlling a revolution rate of a left drive wheel of the following robot to be less than a revolution rate of a right drive wheel of the following robot when the predicted positions of the sampling particles are located at left half of the comparison image; and, d2) controlling the revolution rate of the right drive wheel of the following robot to be less than the revolution rate of the left drive wheel of the following robot when the predicted positions of the sampling particles are located at right half of the comparison image.

One of the exemplary embodiments, the method of tracking target object further comprises following steps: i1) sensing a current distance between the following robot and the target object via a distance-sensing module of the following robot; and, i2) controlling the following robot to speed up for approaching the target object or decelerate for staying away from the target object according to the current distance when the predicted positions are located at a default region of the comparison image.

The present disclosed example can improve analysis efficiency and stability of tracking effectively, implement real-time follow, and make the following robot operate without a signal transmitter.

BRIEF DESCRIPTION OF DRAWING

The features of the present disclosed example believed to be novel are set forth with particularity in the appended claims. The present disclosed example itself, however, may be best understood by reference to the following detailed description of the present disclosed example, which describes an exemplary embodiment of the present disclosed example, taken in conjunction with the accompanying drawings, in which:

FIG. 10 is a schematic view of calculating correct probability according to the present disclosed example;

DETAILED DESCRIPTION OF THE INVENTION

In cooperation with attached drawings, the technical contents and detailed description of the present disclosed example are described thereinafter according to a preferable embodiment, being not used to limit its executing scope. Any equivalent variation and modification made according to appended claims is all covered by the claims claimed by the present disclosed example.

Figure 1:
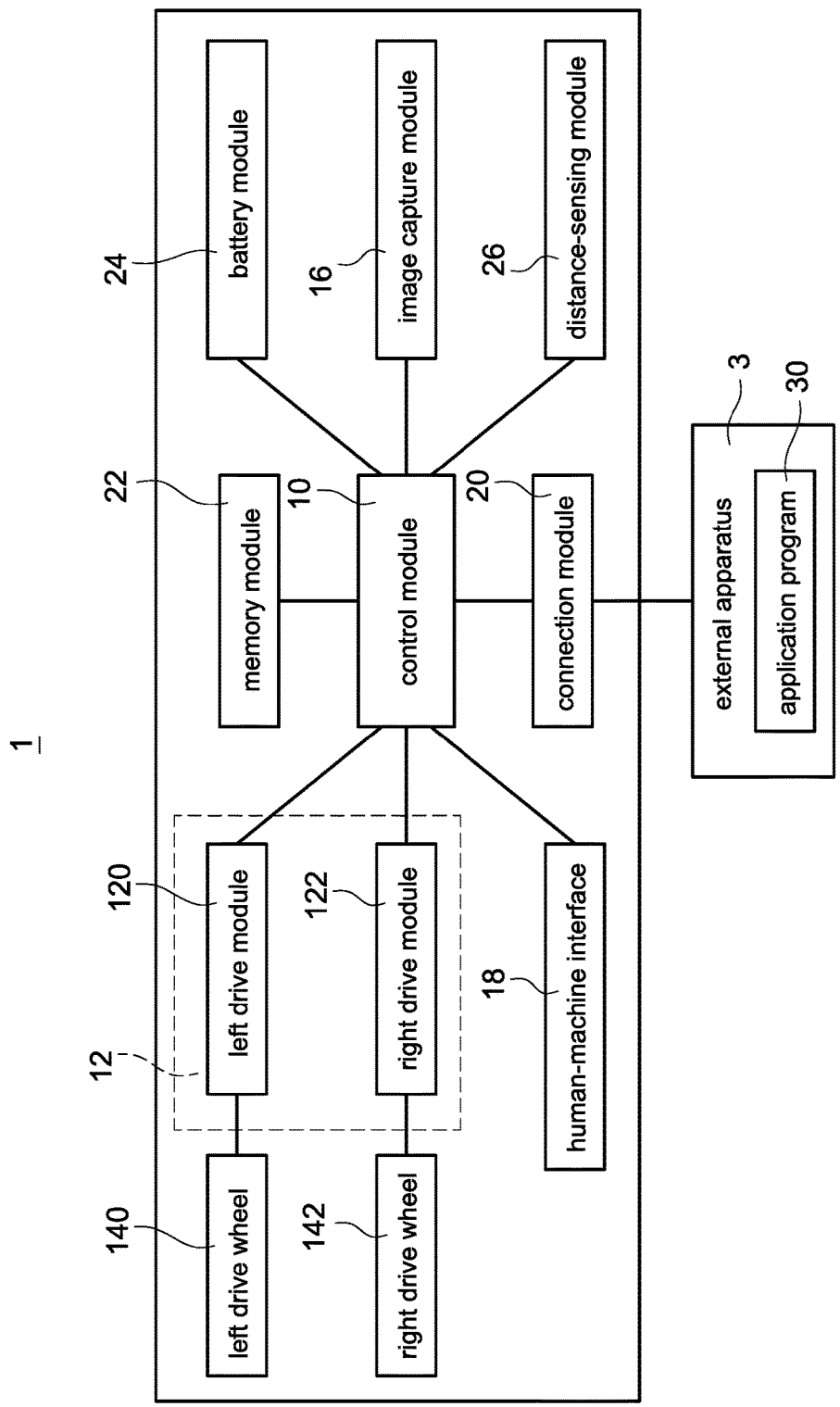
FIG. 1 is an architecture diagram of a following robot according to the first embodiment of the present disclosed example.

Please first refer to FIG. 1 which is an architecture diagram of a following robot according to the first embodiment of the present disclosed example. As shown in the figure, the present disclosed example disclosed a following robot 1 having ability of predicting a moving direction of a target object (such as a user to follow) and tracking the target object via computer vision technology and prediction algorithm. The following robot 1 can implement the real-time following even if the target object does not wear a signal emitter.

More specifically, when the target object starts to move, the following robot 1 may track the target object and predict a direction that the target object wants to move according to a plurality of captured continuous images, and the following robot 1 may move toward the predicted direction for following the target object real-time.

The following robot 1 mainly includes a control module 10, a drive module 12, a plurality of drive wheels (take left drive wheel 140 and right drive wheel 142 for example in FIG. 1, but the number of the drive wheels and configuration manners of drive wheels are not limited), and an image capture module 16.

The control module 10 is electrically connected to the drive module 12 and the image capture module 16, and is used to control the following robot 1.

The drive module 12 is connected to a plurality of drive wheels, and is used to gear the plurality of drive wheels to drive the following robot 1 to move when operating.

One of the exemplary embodiments, the drive module 12 includes left drive module 120 and right drive module 122. The left drive module 120 is connected to the left drive wheel 140 and has ability of gearing the left drive wheel 140 to rotate. The right drive module 122 is connected to the right drive wheel 142 and has ability of gearing the right drive wheel 142 to rotate.

Image capture module 16 is configured to capture the target object (such as the user to track) and the surrounding around the target object.

One of the exemplary embodiments, the image capture module 16 includes an image sensor configured to generate signals of images (such as the reference image and the comparison image described later) and a lens module configured to make the visible light illuminate the image sensor.

One of the exemplary embodiments, the following robot 1 further comprises a human-machine interface 18 electrically connected to the control module 10, such as indicator, buzzer, speaker, button or display. The human-machine interface 18 is configured to receive the user's operation or output a message.

One of the exemplary embodiments, the following robot 1 further includes a connection module 20 electrically connected to the control module 10, such as Wi-Fi wireless module, Bluetooth wireless module or USB wired module. The connection module 20 is configured to wiredly or wirelessly connect to the external apparatus 3, such as smart phone, tablet or wearable device owned by the user, and is configured to communicate with the external apparatus 3. Furthermore, a non-transient memory of the external apparatus 3 stores application program 30, the external apparatus 3 may automatically establish a connection with the following robot 1 when executing the application program 30.

One of the exemplary embodiments, the following robot 1 further includes a memory module 22 electrically connected to the control module 10. The memory module 22 is configured to store data, such as the reference image and the comparison image described later.

One of the exemplary embodiments, the following robot 1 further includes a battery module 24 electrically connected to the control module 10. The battery module 24 is arranged under a carrier board (such as a carrier board 28 shown in FIG. 2A), and is configured to provide operation-required electricity to each element of the following robot 1 via electricity wires.

One of the exemplary embodiments, the following robot 1 further comprises a distance-sensing module 26 (such as ultrasonic sensor, laser range finder or 3D camera) electrically connected to control module 10. The distance-sensing module 26 is configured to sense a distance between the following robot 1 and the target object.

Figure 2A:
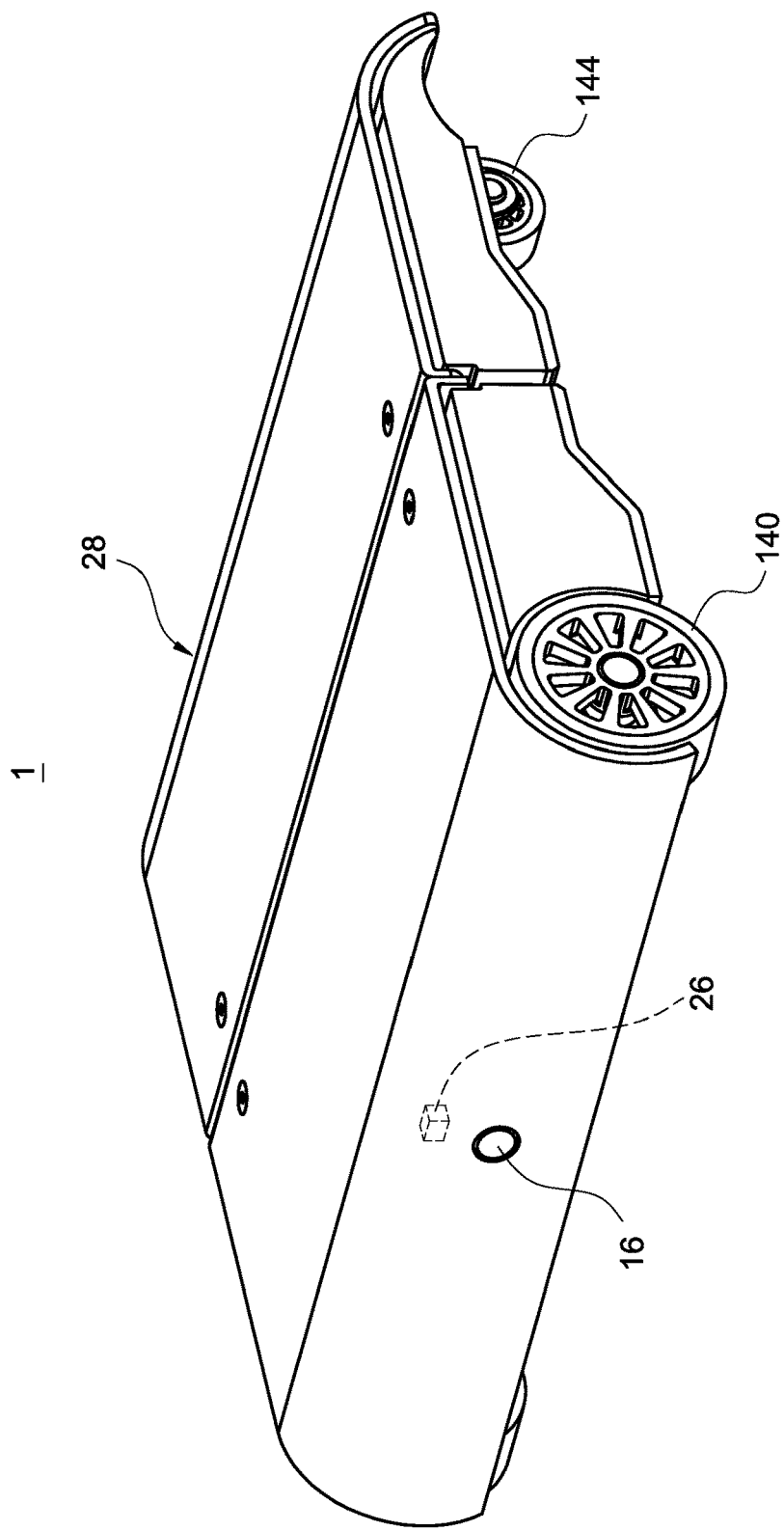
FIG. 2A is a look-down schematic view of a following robot according to the second embodiment of the present disclosed example.
Figure 2B:
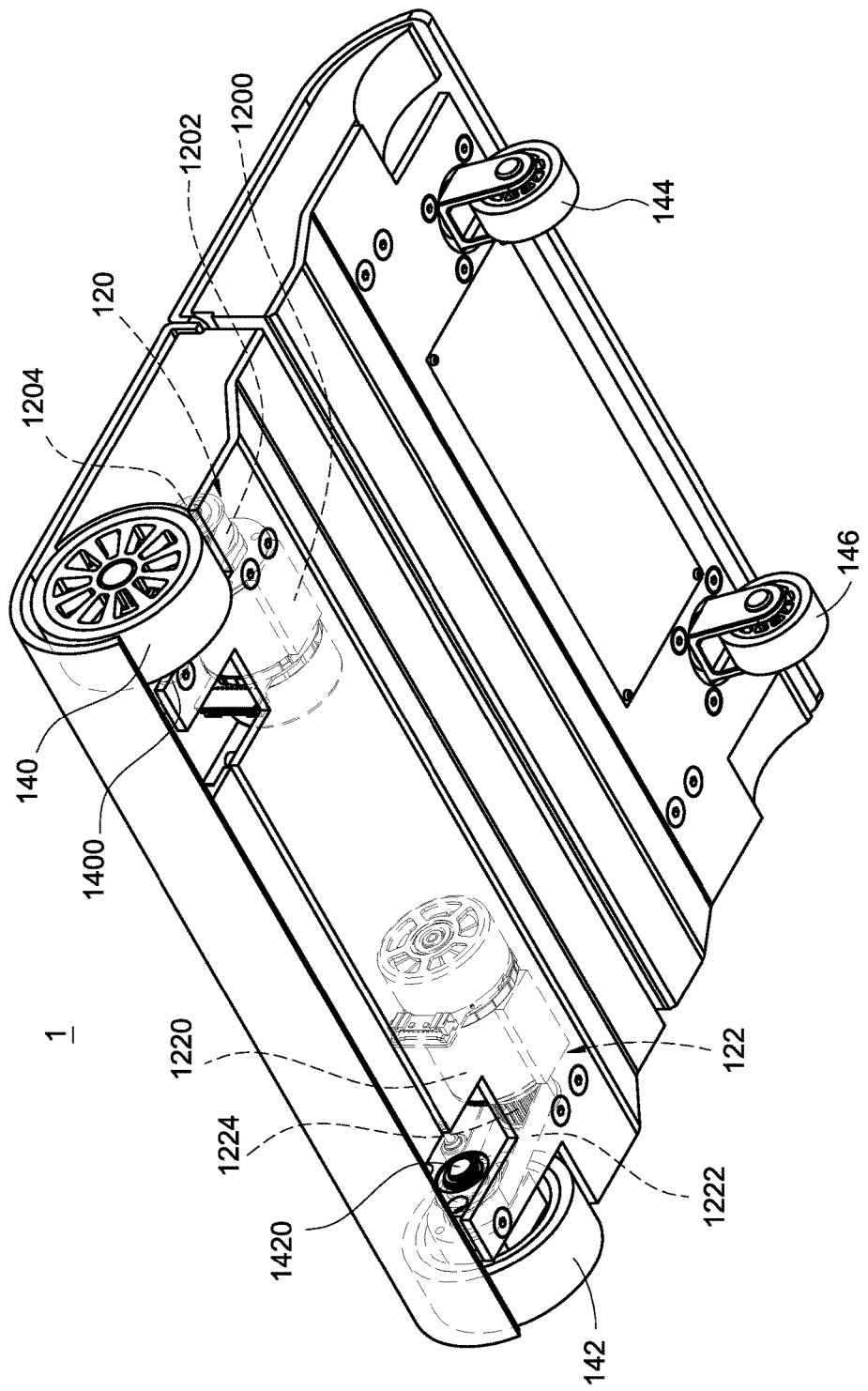
FIG. 2B is a look-up schematic view of a following robot according to the second embodiment of the present disclosed example.

Please refer to FIG. 2A and FIG. 2B simultaneously, FIG. 2A is a look-down schematic view of a following robot according to the second embodiment of the present disclosed example, FIG. 2B is a look-up schematic view of a following robot according to the second embodiment of the present disclosed example.

As shown in figures, the following robot 1 may be an electric skateboard in this embodiment. Both the image capture module 16 and distance-sensing module 26 are arranged at the front of the following robot 1. In this embodiment, the following robot 1 is a vehicle with front-drive architecture. Namely, the left drive wheel 140 and the right drive wheel 142 are arranged at the front of the following robot 1, and two linkage wheels 144-146 are arranged at the rear of the following robot 1 opposite to the front of the following robot 1 for balancing the following robot 1.

In this embodiment, the left drive module 120 comprises a left motor 1200, a left drive belt 1202, and a left drive rod 1204. The left drive wheel 140 comprises a left linkage rod 1400. The left drive belt 1202 is sleeved on the left drive rod 1204 and the left linkage rod 1400 so that the left drive wheel 140 is driven to rotate by rotating the left linkage lever 1400 driven by the left drive lever 1204. The right drive module 122 comprises a right motor 1220, a right drive belt 1222, and a right drive rod 1224. The right drive wheel 142 comprises a right linkage rod 1420. The right drive belt 1222 is sleeved on the right drive rod 1224 and the right linkage lever 1420 so that the right drive wheel 142 is driven to rotate by rotating the right linkage rod 1420 driven by the right drive rod 1224.

Figure 3:
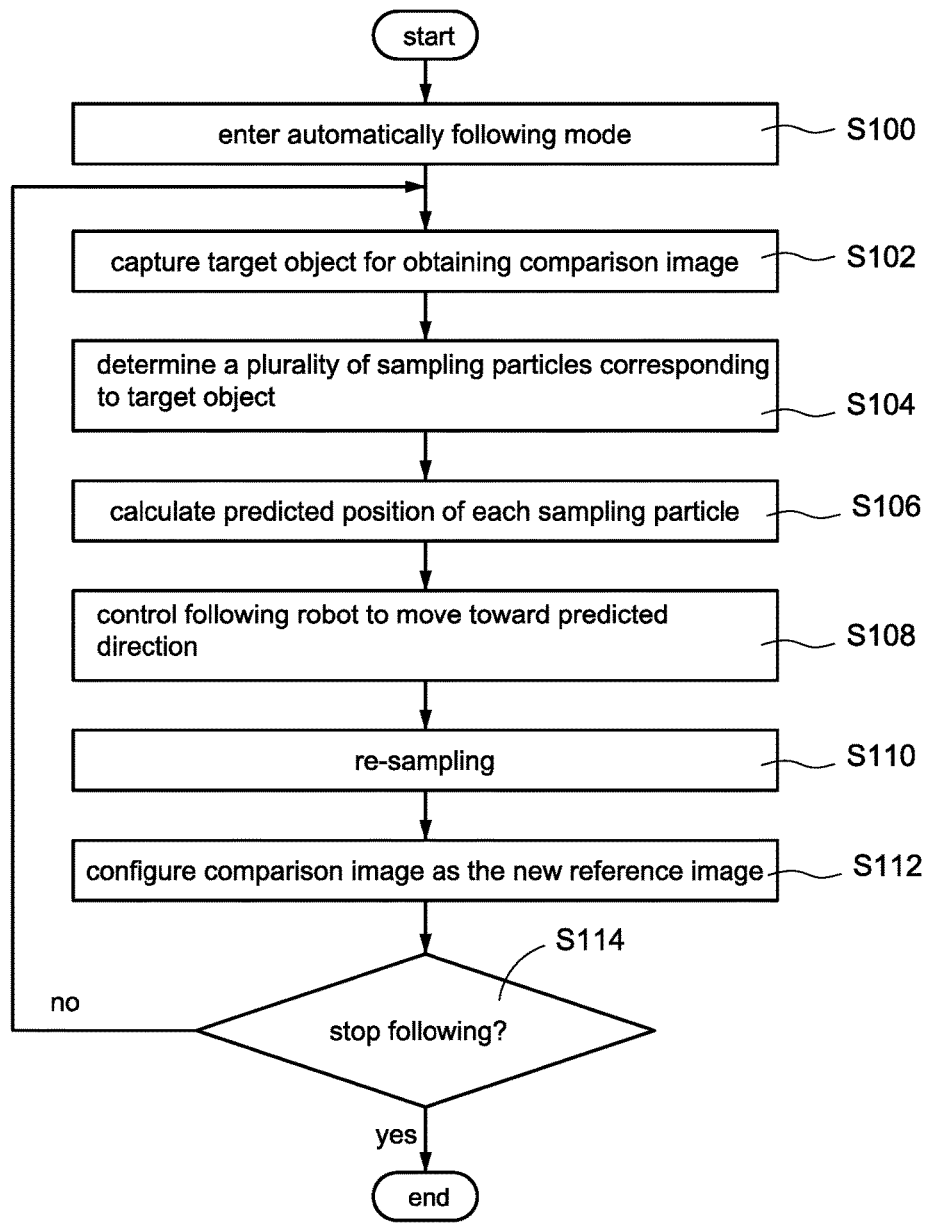
FIG. 3 is a flowchart of a method of tracking target object according to the first embodiment of the present disclosed example.

Please refer to FIG. 3, which is a flowchart of a method of tracking target object according to the first embodiment of the present disclosed example. In particular, the method of tracking target object of each embodiment of the present disclosed example is implemented by the following robot 1 shown in FIG. 1 to FIG. 2B.

In the embodiment shown in FIG. 3, the memory module 22 of the following robot 1 comprises a non-transient computer readable media, and stores computer software, such as application or firmware. Above-mentioned computer software records computer executable codes, the control module 10 may control the following robot 1 to perform each step of the method of tracking target object of each embodiment of the present disclosed example.

The method of tracking target object of this embodiment comprises following steps.

Step S100: the control module 10 controls the following robot 1 to switch the current mode to an automatically following mode for starting to follow the target object. One of the exemplary embodiments, the control module 10 controls the following robot 1 to switch the current mode to the automatically following mode when receiving the user's following operation via the human-machine interface 18 or receiving a following command from the external apparatus 3 via the connection module 20.

Step S102: the control module 10 captures the target object for obtaining a comparison image, such as the first comparison image.

One of the exemplary embodiments, the present disclosed example assumes that the target object is in front of the following robot 1 continuously. Under this assumption, the image capture module 16 must not execute the target recognition and must not execute a process of changing an angle of viewfinder and a focal length of lens according to a result of target recognition additionally. Namely, the image capture module 16 may capture the view in front of the following robot 1 by using the fixed angle of viewfinder and the fixed focal length of lens so that the obtained comparison image includes image of the target object.

Step S104: the control module 10 determines a plurality of sampling particles belonging to the target object from the captured comparison image, such as 3000 sampling particles. The number of the sampling particles may be adjusted according to the user's requirement or the size of the comparison image arbitrarily.

Please be noted that above-mentioned sampling particles are virtual particles defined in the captured comparison image for tracking target object in the present disclosed example, each sampling particle corresponds to partial specific physical object shown in the image, such as user, table feet, pet or the other physical object. Therefore, the positions of the corresponding sampling particles in the different comparison images may be at the same position (if the physical object didn't move) as or the different positions (if the physical object had moved). Besides, the size of each sampling particle may be one or more pixel(s), but this specific example is not intended to limit the scope of the present disclosed example.

One of the exemplary embodiments, the control module 10 executes target-recognizing process to the comparison image for recognizing image of the target object from the comparison image when first to determine the sampling particle. For example, the currently processing comparison image is the first comparison image. Then, the control module 10 configures a plurality of sampling particles in interior or edge of the recognized image of the target object. Thus, the first determined sampling particles correspond to the image of the target object accuracy, so as to enhance the accuracy of predicted direction of the automatic following in the initial stage.

One of the exemplary embodiments, the control module 10 determines a plurality of positions in the comparison image randomly and configures the determined positions as the positions of the sampling particles when first to determine the sampling particles. The present disclosed example can effectively improve efficiency of the automatic following in the initial stage via omitting the target-recognizing process.

One of the exemplary embodiments, when the second time or later to determine the sampling particle, the control module 10 configures a predicted position of each sampling particle predicted last time as a current position of each sampling particle this time.

Step S106: the control module 10 calculates each predicted position of each sampling particle in next comparison image according to the current position in the current comparison image and each current velocity of each sampling particle.

One of the exemplary embodiments, each sampling particle may be represented by a status vector. For example, the status vector of the i-th sampling particle is $[p_i,v_i]$, wherein $p_i$ means the position of the i-th sampling particle in the comparison image, and may be represented in coordinate $(x_i,y_i)$; $v_i$ means the current velocity of the i-th sampling particle, and may be represented in velocity component vector $(v_{xi}, v_{yi})$.

One of the exemplary embodiments, the control module 10 calculates each predicted position of each sampling particle by using following formula (1).

$$p_{t+1}=p_t+(v_t+a)\Delta t \qquad \text{formula (1)}$$

wherein $p_{t+1}$ means each predicted position of each sampling particle in next comparison image; $p_t$ means each current position of each sampling particle in the current comparison image; $v_t$ means each current velocity of each sampling particle; a means each acceleration of each sampling particle; $\Delta t$ means a time difference between the time of capturing the current comparison image and the time of capturing the next comparison image.

For example, assume following conditions. The image capture module 16 captures the comparison images with the frequency of 30 FPS (frames per second), namely, the $\Delta t$ is ⅓₀ seconds. The position $p_t$ of the sampling particle in the first comparison image is (3,3), the current velocity $v_t$ is (0,0). As a result, the position $p_{t+1}$ of the sampling particle in the second comparison image is (5,3) according to above assumed conditions and the formula (1).

Thus, the present disclosed example can effectively calculate each predicted position of each sampling particle in the next comparison image.

Step S108: the control module 10 determines the corresponded predicted direction according to each calculated predicted position of each sampling particles, and controls the following robot 1 to move toward the determined predicted direction.

Step S110: the control module 10 re-samples the sampling particles for eliminating a part of the sampling particles belonging to the physical object which is not the target object, so as to enhance the accuracy of the predicted direction determined later. More specifically, the control module 10 loads a reference image captured in advance, recognizes the difference between the loaded reference image and the current comparison image, and re-samples the sampling particles according to the recognized difference.

One of the exemplary embodiments, the control module 10 only re-samples a part of the sampling particles, such as only re-sampling 100 sampling particles. For example, the control module 10 may recognize and delete the sampling particles belonging to the physical object which is not the target object, and adds the new sampling particles randomly or in accordance with a default rule.

One of the exemplary embodiments, during re-sampling each time, the control module 10 deletes a default number of the sampling particles, and adds the same number of the new sampling particles. Thus, the present disclosed example can keep the number of the sampling particles being static, such as 3000. The present disclosed example can keep the time of calculating the predicted positions being static via keeping the number of the sampling particles being static because the time of calculating the predicted positions relates to the number of the sampling particles.

Step S112: the control module 10 configures the current comparison image as the new reference image, and stores the new reference image in the memory 22. Thus, the following re-sampling process is executed by using the two images having the similar capturing time or capturing order.

Step S114: the control module 10 determines whether the automatically following is terminated. Namely, the control module 10 determines whether the following robot 1 exits the automatically following mode. One of the exemplary embodiments, the control module 10 control the following robot 1 to exit the automatically following mode when receiving a stop following operation via the human-machine interface 18 from the user or receiving a stop following command via the connection module 20.

If the control module 10 determines the automatically following is not terminated yet, the control module 10 executes the steps S102 to step S112 for capturing the new comparison image (such as the second comparison image) and executes the automatically following according to the new comparison image.

The present disclosed example can effectively improve analysis efficiency and analysis stability of tracking the target object via re-sampling according to each predicted position of each sampling particle and the difference between images.

The present disclosed example can effectively implement the real-time following, and make the following robot 1 operate without the signal transmitter via capturing the comparison images and controlling the following robot 1 to move according each predicted position of each sampling particle.

Figure 4:
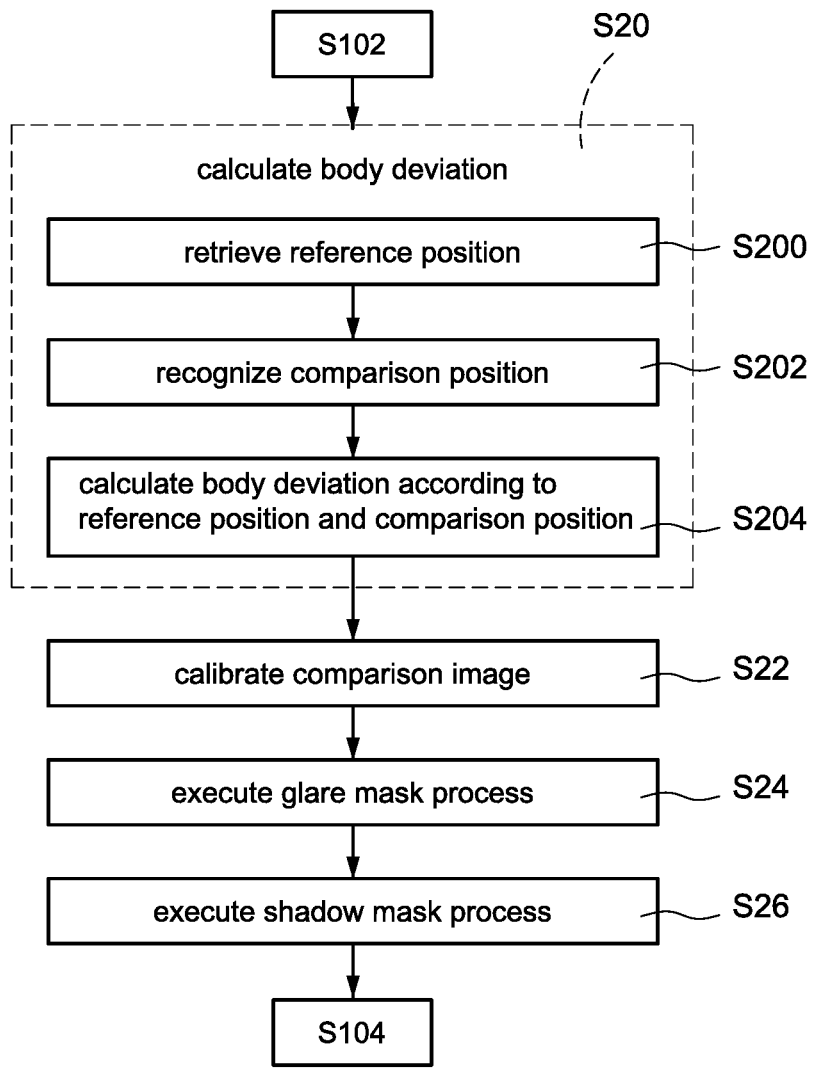
FIG. 4 is a partial flowchart of a method of tracking target object according to the second embodiment of the present disclosed example.

Please refer to FIG. 3 and FIG. 4 simultaneously, FIG. 4 is a partial flowchart of a method of tracking target object according to the second embodiment of the present disclosed example. In the embodiment shown in FIG. 4, the control module 10 may execute a pre-process for reducing negative effect caused by body deviation and extreme brightness, so as to further enhance the accuracy of the predicted direction determined in accordance with the pre-processed comparison image. Compare to the embodiment shown in FIG. 3, the method of the embodiment shown in FIG. 4 further includes following steps between the step S102 and the step S104.

Because the following robot 1 moves continuously for following target object during capturing each comparison image, there are mainly two reasons of formation of the difference between the reference image and the comparison image, one is that the target object (and the other physical object in the same surrounding) moves and changes the position in the viewfinder of the image capture module 16, another one is that the frame of viewfinder of the image capture module 16 has deviation caused by movement of the following robot 1. For preventing the latter reason from affecting the accuracy of the determined predicted direction, the present disclosed example disclosed a function of movement compensation.

Step S20: the control module 10 calculates a body deviation of the image capture module 16 according to the reference image and the current comparison image.

Figure 9A:
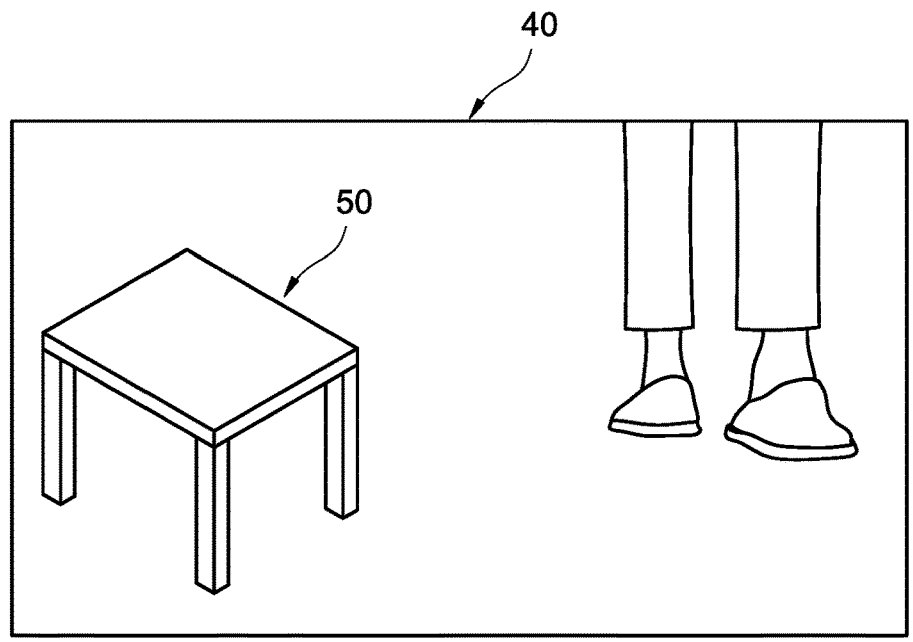
FIG. 9A is a first schematic view of a movement compensation function according to the present disclosed example.
Figure 9B:
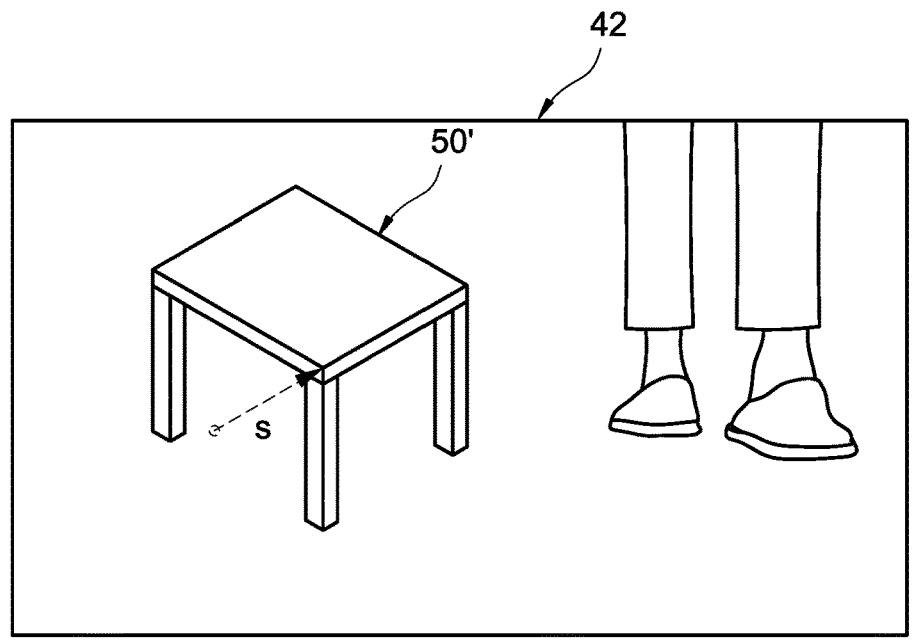
FIG. 9B is a second schematic view of a movement compensation function according to the present disclosed example.

Please refer to FIG. 9A and FIG. 9B simultaneously, FIG. 9A is a first schematic view of a movement compensation function according to the present disclosed example, FIG. 9B is a second schematic view of a movement compensation function according to the present disclosed example. One of the exemplary embodiments, the step S20 comprises following steps.

Step S200: the control module 10 retrieves one or more reference position(s) of image of a static physical object (such as desk, chair, cupboard, building or the other physical object having the stable position) in the reference image.

For example, as shown in FIG. 9A, the control module 10 may execute an image-recognizing process to the reference image for recognizing the image 50 of the static physical object (take desk for example), and records the position of the image 50.

Step S202: the control module 10 recognizes the comparison position of the image of the same static physical object in the comparison image.

For example, as shown in FIG. 9B, the control module 10 may execute the image-recognizing process to the current comparison image 42 for recognizing the image 50' of the same desk in the comparison image 42, and the control module 10 may record the position in the comparison image of the image 50'.

Step S204: the control module 10 calculates a body deviation of the image capture module 16 according to the reference position of the image of the static physical object in the reference image and the comparison position of the image of the static physical object in the comparison image.

For example, as shown in FIG. 9A and FIG. 9B, the control module 10 calculates the body deviation S according to the position of the image 50 and the position of the image 50'.

Step S22: the control module 10 calibrates the comparison image according to the calculated body deviation.

One of the exemplary embodiments, the control module 10 executes an image-shifting process or an image-rotating process to the comparison image according to the calculated body deviation so that the position of the static physical object in the comparison image is consistent with the position of the static physical object in the reference image.

The present disclosed example can effectively implement the movement compensation function, and enhance the accuracy of the predicted direction.

The present disclosed example further discloses a function of filtering out extreme brightness (step S24 to step S26) having ability of filtering out a high brightness region (such as a glare region) and a low brightness region (such as a shadow region) from the comparison image. Step S24: the control module 10 executes a glare mask process to the comparison image for filtering out the high brightness region in the comparison image.

One of the exemplary embodiments, the control module 10 filters out the pixels which their pixel values are larger than a default glare value. Take 8 bits gray-scale image for example, the default glare value may be 200.

Step S26: the control module 10 executes a shadow mask process to the comparison image for filtering out the low brightness region in the comparison image.

One of the exemplary embodiments, the control module 10 filters out the pixels which their pixel values are less than a default shadow value. Take 8 bits gray-scale image for example, the default shadow value may be 100.

Please be noted that the region had been filtered out in the steps S24-S26 will be excluded by the control module 10 automatically when the control module 10 executes the step S104 to determine the sampling particles. Namely, there is not any sampling particle configured in the region had been filtered out.

The present disclosed example can effectively implement the function of filtering out extreme brightness, and enhance the accuracy of the predicted direction.

Figure 5:
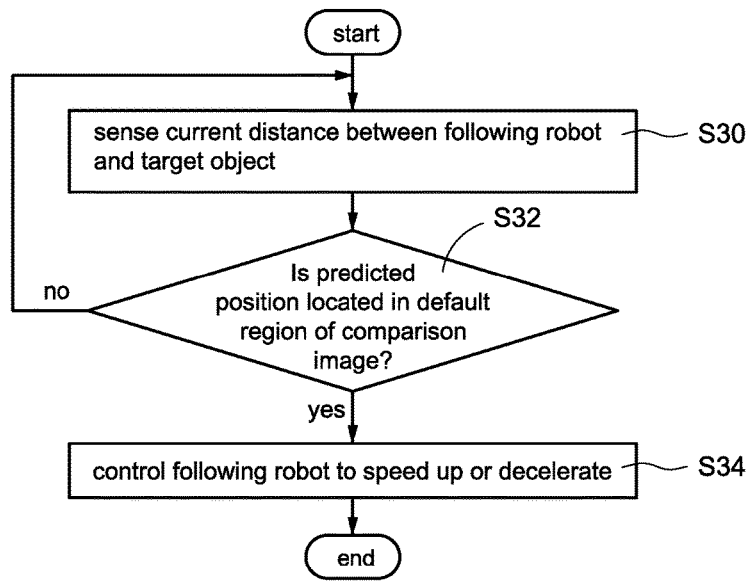
FIG. 5 is a partial flowchart of a method of tracking target object according to the third embodiment of the present disclosed example.

Please refer to the FIG. 3 and FIG. 5 simultaneously, FIG. 5 is a partial flowchart of a method of tracking target object according to the third embodiment of the present disclosed example. There is a problem that the following robot 1 doesn't have ability of estimating the actual distance (namely, the distance in 3D space) between the following robot 1 and the target object according to the single 2D comparison image captured by the image capture module 16. For solving above problem, the embodiment shown in FIG. 5 discloses a distance-adjusting function. The following robot 1 senses the actual distance between the following robot 1 and the target object by the distance-sensing module 26, and the following robot 1 controls the straight velocity according to the actual distance for making the following robot 1 keep the target object in an appropriate distance.

Compare to the embodiment shown in FIG. 3, the method of tracking target object of the embodiment shown in FIG. 5 further comprises following steps.

Step S30: the control module 10 senses a current distance between the following robot 1 and the target object via the distance-sensing module 26.

Step S32: the control module 10 determines whether the predicted positions of the sampling particles calculated last time are located in the default region (such as central region) of the comparison image.

More specifically, if the predicted position(s) are located at both sides (left side or right side) of the comparison image, it's possible that the target object moves toward both sides (left side or right side) of the following robot 1 at the next time (such as the target object turning) rather than moves forward. In this situation, if the following robot 1 moves forward in straight line continuously, the following robot 1 may deviate the movement track of the target object, and the target object may move out from the range of the viewfinder of the image capture module 16 and the following robot 1 make a failure in following the target object.

If the control module 10 determines the predicted positions are located in the default region of the comparison image, the control module 10 executes step S34. Otherwise, the control module 10 executes the step S30 again.

Step S34: the control module 10 controls the drive module 12 of the following robot 1 to speed up or decelerate according to the sensed current distance for approaching or separating from the target object.

One of the exemplary embodiments, the control module 10 loads a default distance from the memory module 22, and compares the current distance and the default distance. If the current distance is less than the default distance, the control module 10 controls the drive module 12 to speed up for increasing the current distance. If the current distance is larger than the default distance, the control module 10 controls the drive module 12 to decelerate for reducing the current distance. Thus, the present disclosed example can keep the distance between the following robot 1 and the target object in the stable default distance.

One of the exemplary embodiments, the steps S30-S34 and the steps S100-S114 may be executed simultaneously. Namely, the control module 10 may execute the steps S100-S114 for implementing the automatically following function, and execute the steps S30-S34 for implementing the distance-adjusting function at the same time.

One of the exemplary embodiments, the control module 10 may not execute the step S32, and directly control the drive module 12 to speed up or decelerate according to the current distance.

Figure 6:
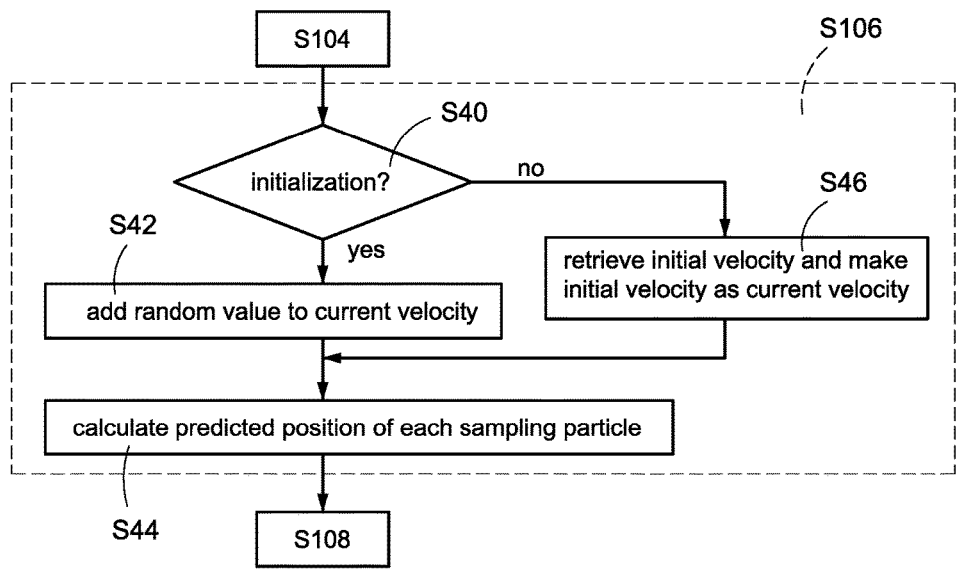
FIG. 6 is a partial flowchart of a method of tracking target object according to the fourth embodiment of the present disclosed example.

Please refer to FIG. 3 and FIG. 6 simultaneously, FIG. 6 is a partial flowchart of a method of tracking target object according to the fourth embodiment of the present disclosed example. The embodiment shown in FIG. 6 is used to explain how to calculate the current velocity of each sampling particle. Compare to the embodiment shown in FIG. 3, the method of tracking target object of the embodiment shown in FIG. 6 further comprises following steps.

Step S40: the control module 10 determines whether the initialization had been completed. More specifically, the control module 10 determines that the initialization doesn't have been completed when the number of the captured comparison images is less than a default number (such as 2), and executes the step S46. The control module 10 determines that the initialization had been completed when the number of the captured comparison images is not less than the default number, and executes the step S42.

Take the default number being 1 for example, the control module 10 executes the step S46 for configuring each initial velocity of each sampling particle if the current comparison image is the first comparison image. The control module 10 executes the step S42 for configuring each new current velocity of each sampling particle if the current comparison image is not the first comparison image (such as the second comparison image, the third comparison image, the fourth comparison image and so on).

Step S42: the control module 10 executes a random-value-generating process for generating a plurality of random values, and adds the random values to the current velocities of the sampling particles respectively for obtaining the new current velocities of the sampling particles.

One of the exemplary embodiments, each generated random value is less than the current velocity before adding the random value.

Please be noted that, the step S42 makes each random value as the white noise for simulating the variation of the velocities of each sampling particle.

Step S44: the control module 10 calculates each predicted position of each sampling particle according to each current position and each current velocity of each sampling particle and a capturing time difference between time of capturing the reference image and time of capturing the comparison image. More specifically, the control module 10 calculates each predicted position of each sampling particle according to the above-mentioned formula (1). Then, the control module 10 executes the step S108.

If the control module 10 determines that the initialization doesn't have been completed, the control module 10 executes the step S46: the control module 10 retrieving the initial velocity (such as 0) and making the retrieved initial velocity as the initial value of each current velocity.

The present disclosed example can effectively simulate the velocity variation of each sampling particle, and enhance the accuracy of the predicted direction.

Figure 7:
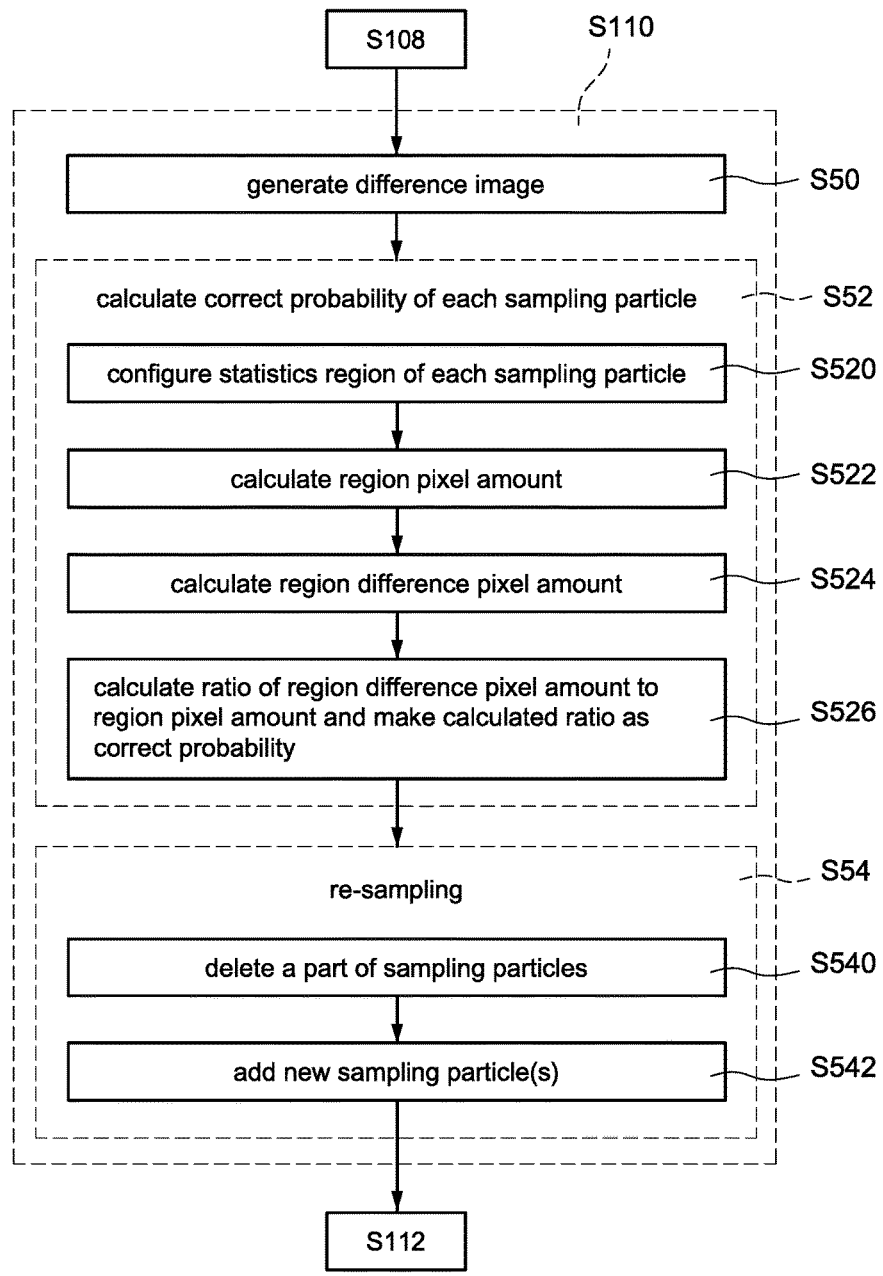
FIG. 7 is a partial flowchart of a method of tracking target object according to the fifth embodiment of the present disclosed example.

Please refer to FIG. 3, FIG. 7 and FIG. 10 simultaneously. FIG. 7 is a partial flowchart of a method of tracking target object according to the fifth embodiment of the present disclosed example. FIG. 10 is a schematic view of calculating correct probability according to the present disclosed example. In the embodiment shown in FIG. 7, the control module 10 calculates a correct probability of each sampling particle according to the different between the reference image and the comparison image, and re-samples the sampling particles according to the calculated correct probability. Compare to the embodiment shown in FIG. 3, the step S110 of the method of tracking target object of the embodiment shown in FIG. 7 comprises following steps.

Step S50: the control module 10 compares the reference image with the comparison image, and generates a difference image according to a result of comparison.

One of the exemplary embodiments, the control modules 10 executes a subtraction process to the reference image and the comparison image for generating the difference image, wherein the size of the difference image is the same as the size of the comparison image. Besides, the control module 10 may further execute a binarization process to the difference image for obtaining black and white difference image. Namely, each pixel value of each pixel (namely, difference pixel pixel) of the processed difference image is 0 or 1.

Step S52: the control module 10 calculates the correct probability of each sampling particle belonging to the target object according to the difference image.

One of the exemplary embodiments, the step S52 comprises following steps.

Step S520: the control module 10 determines each current position of each sampling particle in the difference image, and configures each statistics region of each sampling particle in the difference image according to each current position of each sampling particle.

One of the exemplary embodiments, each statistics region covers a specific number of pixels around each current position of each sampling particle, such as 8-Neighborhoods or 4-Neighborhoods, but this specific example is not intended to limit the scope of the present disclosed example.

Step S522: the control module 10 calculates each number of all pixels in each statistic region for obtaining each region pixel amount.

Take the statistics region being 8-Neighborhoods for example, the region pixel amount is 9 (comprising the pixel being located at the current position of the sampling particle). Take the statistics region being 4-Neighborhoods for example, the region pixel amount is 5.

Step S524: the control module 10 calculates each number of the difference pixels (such as the number of the pixels having the pixel value 1) in each statistic region of each sampling particle for obtaining each region difference pixel amount.

Step S526: the control module 10 calculate each ratio of each region difference pixel amount corresponding to each sampling particle to each region pixel amount corresponding to each sampling particle, and makes each calculated ratio as each correct probability of each sampling particle belonging to the target object.

For example, as shown in FIG. 10, in the difference image, all the region difference pixel amounts of the sampling particles 60-64 are 9, the region difference pixel amount (namely, the number of the pixels having the pixel value 1) corresponding to the sampling particles 60 is 7, the region difference pixel amount corresponding to the sampling particles 62 is 5, and the region difference pixel amount corresponding to the sampling particles 64 is 1.

Thus, the correct probability of the sampling particle 60 is 7/9, the correct probability of the sampling particle 62 is 5/9, and the correct probability of the sampling particle 64 is 1/9.

Then, the control module 10 executes the step S54: the control module 10 re-sampling the sampling particles according to the correct probabilities of the sampling particles.

One of the exemplary embodiments, the step S54 comprises following steps.

Step S540: the control module 10 deletes a part of sampling particles having the lower correct probability.

One of the exemplary embodiments, the control module 10 deletes a default number of the sampling particles having the lowest correct probability, such as the sampling particles having the correct probability under top 300 low.

Step S542: the control module 10 re-samples around the sampling particle having high correct probability for adding the new sampling particle. One of the exemplary embodiments, the number of added sampling particles is the same as the number of the deleted sampling particles. This, the number of the sampling particles can be keep in stable value.

As shown in FIG. 10, take deleting one sampling particle and adding one sampling particle for example, the control module 10 may delete the sampling particle 64 having the lowest correct probability, and add the sampling particle 66 at the position around the sampling particle 60 having the highest correct probability.

Then, the control module 10 executes the step S112.

Figure 8:
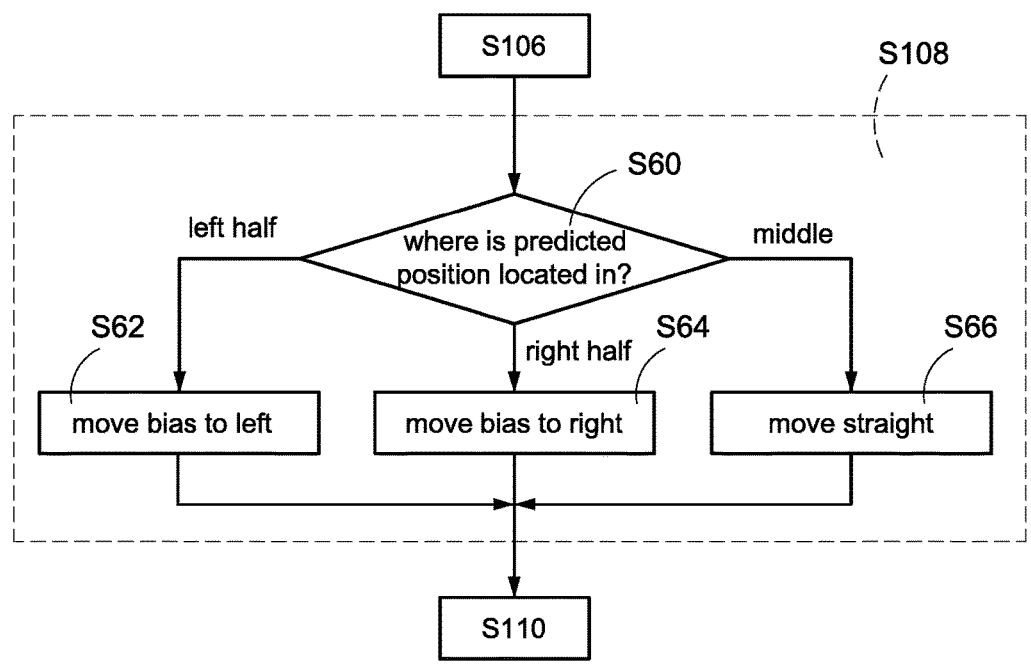
FIG. 8 is a partial flowchart of a method of tracking target object according to the sixth embodiment of the present disclosed example.

Please refer to FIG. 3 and FIG. 8 simultaneously, FIG. 8 is a partial flowchart of a method of tracking target object according to the sixth embodiment of the present disclosed example. In the embodiment shown in FIG. 8, the present disclosed example further discloses a function of following to turn. More specifically, the control module 10 may determines whether the target object turns according to the predicted positions of the sampling particles, and the control module 10 may control the following robot 1 to turn for following the target object continuously when determining that the target object turned.

Compare to the embodiment, the step S108 of the method of tracking the target object of the embodiment shown in FIG. 8 further comprises following steps.

Step S60: the control module 10 analyzes a distribution of the predicted positions of the sampling particles in the comparison image.

If most of the predicted positions distributes are in the left half of the comparison image, the control module 10 determines that the target object would like to turn left, and executes the step S62. If most of the predicted positions distributes are in the right half of the comparison image, the control module 10 determines that the target object would like to turn right, and executes the step S64. If most of the predicted positions distributes are in the middle of the comparison image, the control module 10 determines that the target object would like to move forward, and executes the step S66.

Step S62: the control module 10 configures the directed direction as moving bias to left, and controls a revolution rate of the left drive wheel to be less than a revolution rate of the right drive wheel so that the following robot 1 moves bias to left.

One of the exemplary embodiments, the control module 10 adjusts the revolution rate of left motor 1200 of the left drive module 120 and the revolution rate of right motor 1220 of the right drive module 122 for making the revolution rate of the left drive wheel 140 be less than the revolution rate of the right drive wheel 142 so that the following robot 1 moves bias to left gradually.

Step S64: the control module 10 configures the directed direction as moving bias to right, and controls the revolution rate of the right drive wheel to be less than the revolution rate of the left drive wheel so that the following robot 1 moves bias to right.

One of the exemplary embodiments, the control module 10 adjusts the revolution rate of left motor 1200 of the left drive module 120 and the revolution rate of right motor 1220 of the right drive module 122 for making the revolution rate of the left drive wheel 140 be higher than the revolution rate of the right drive wheel 142 so that the following robot 1 moves bias to right gradually.

Step S66: the control module 10 configures the predicted direction as moving straight, and controls the revolution rate of the right drive wheel 142 to be equal to the revolution rate of the left drive wheel 140 so that the following robot 1 move straight.

One of the exemplary embodiments, the control module 10 adjusts the revolution rate of left motor 1200 of the left drive module 120 and the revolution rate of right motor 1220 of the right drive module 122 for making the revolution rate of the left drive wheel 140 be equal to the revolution rate of the right drive wheel 142 so that the following robot 1 moves straight.

The present disclosed example can effectively implement the function of following to turn, so as to follow continuously when the target object turns. Besides, the present disclosed example can make the following robot 1 have ability of moving bias to left or right without arranging any steering mechanism via making a difference between the revolution rates occur between the two drive wheels, so as to further reduce the manufacturing cost and the device volume of the following robot 1.

Figure 11A:
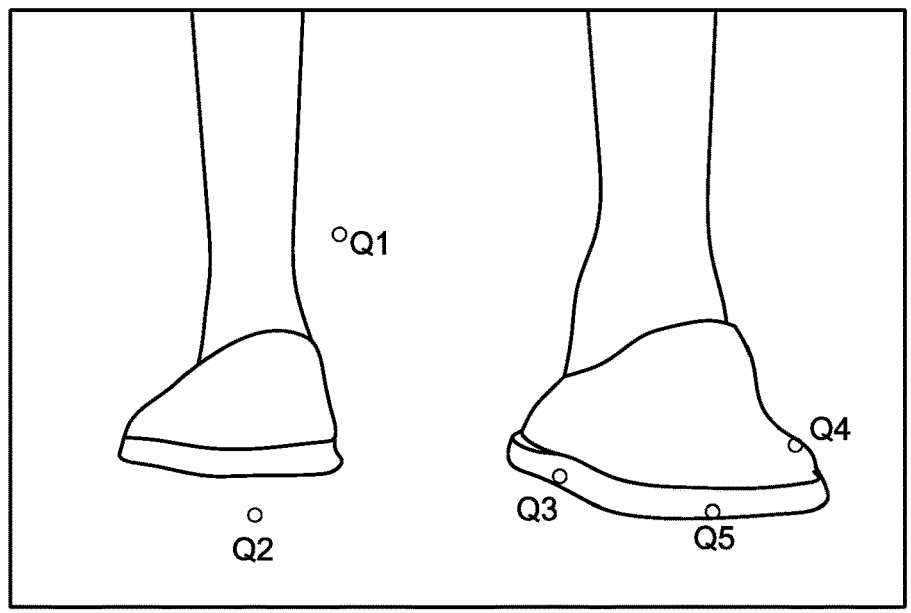
FIG. 11A is a schematic view of the first comparison image and the variation in sampling particles according to the present disclosed example.
Figure 11B:
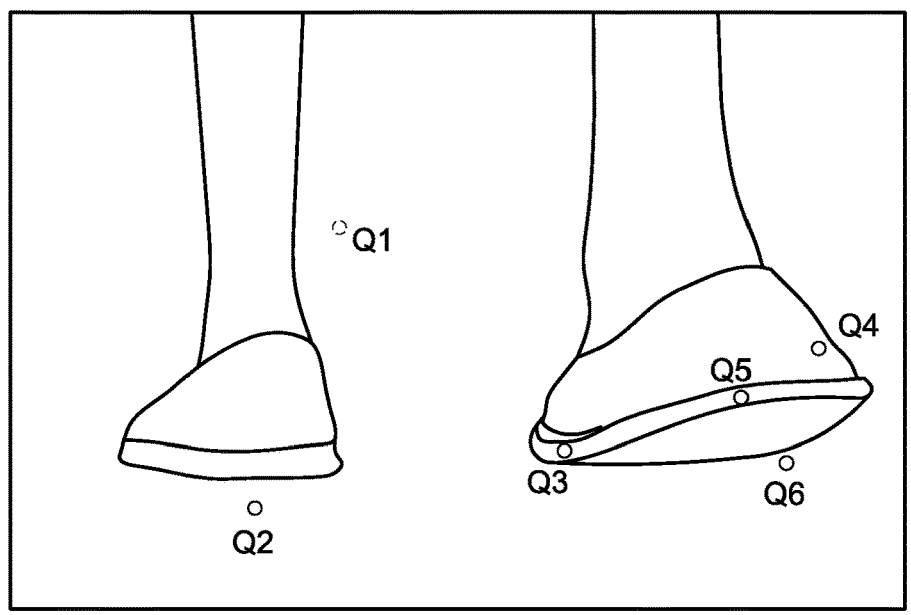
FIG. 11B is a schematic view of the second comparison image and the variation in sampling particles according to the present disclosed example.
Figure 11C:
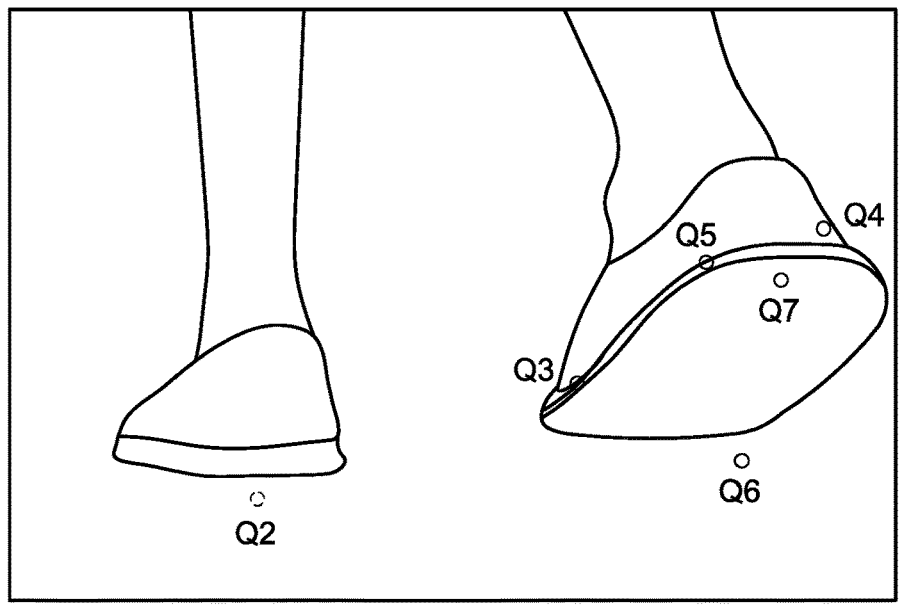
FIG. 11C is a schematic view of the third comparison image and the variation in sampling particles according to the present disclosed example.
Figure 11D:
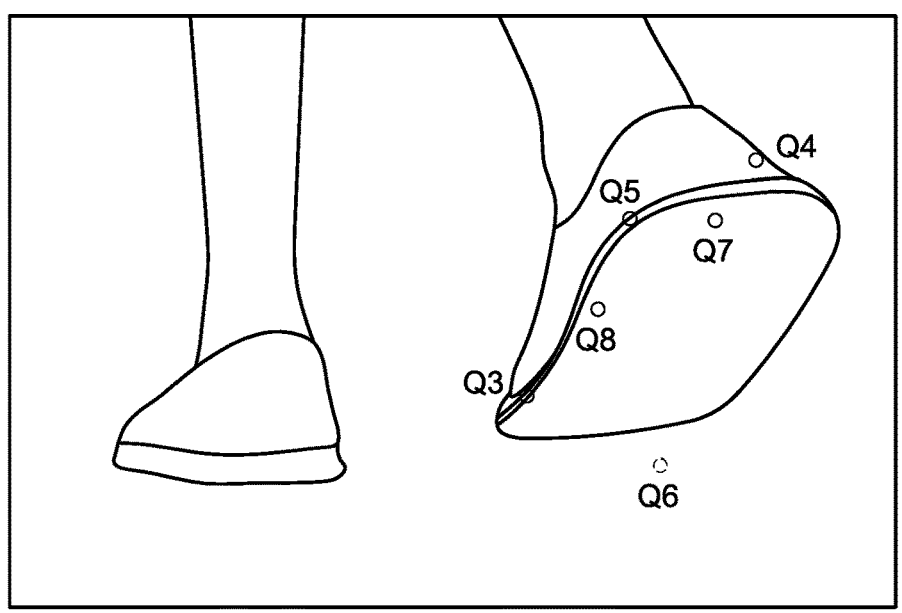
FIG. 11D is a schematic view of the fourth comparison image and the variation in sampling particles according to the present disclosed example.
Figure 12A:
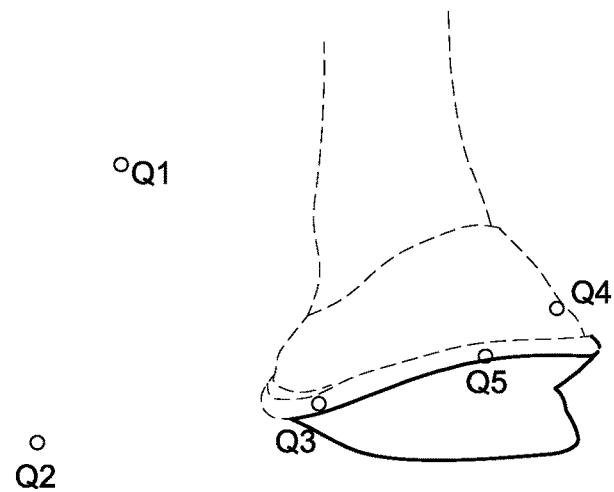
FIG. 12A is a schematic view of a difference image between the first comparison image and the second comparison image and the variation in sampling particles according to the present disclosed example.
Figure 12B:
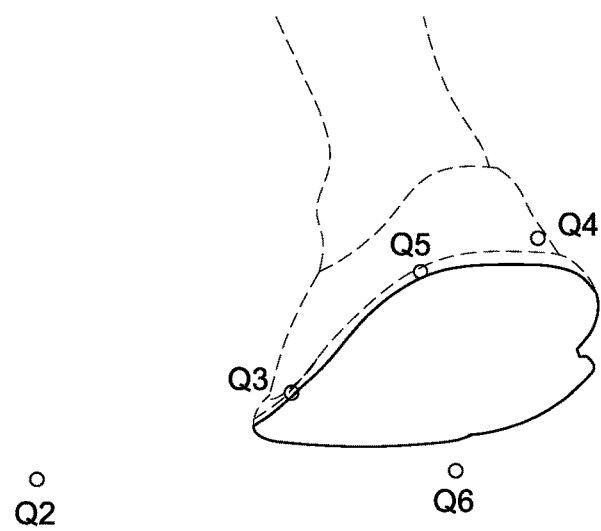
FIG. 12B is a schematic view of a difference image between the second comparison image and the third comparison image and the variation in sampling particles according to the present disclosed example.
Figure 12C:
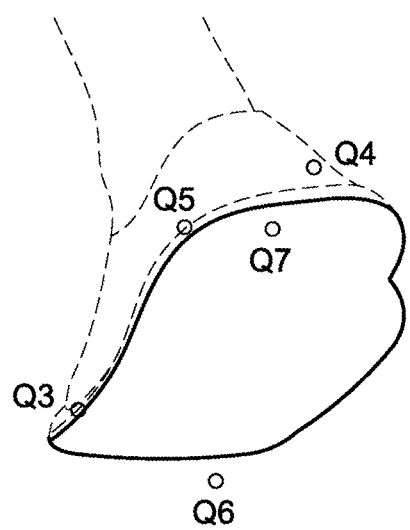
FIG. 12C is a schematic view of a difference image between the third comparison image and the fourth comparison image and the variation in sampling particles according to the present disclosed example.

Please refer to FIG. 11A to FIG. 12C simultaneously, FIG. 11A is a schematic view of the first comparison image and the variation in sampling particles according to the present disclosed example, FIG. 11B is a schematic view of the second comparison image and the variation in sampling particles according to the present disclosed example, FIG. 11C is a schematic view of the third comparison image and the variation in sampling particles according to the present disclosed example, FIG. 11D is a schematic view of the fourth comparison image and the variation in sampling particles according to the present disclosed example, FIG. 12A is a schematic view of a difference image between the first comparison image and the second comparison image and the variation in sampling particles according to the present disclosed example, FIG. 12B is a schematic view of a difference image between the second comparison image and the third comparison image and the variation in sampling particles according to the present disclosed example, and FIG. 12C is a schematic view of a difference image between the third comparison image and the fourth comparison image and the variation in sampling particles according to the present disclosed example. FIG. 11A to FIG. 12C are used to exemplary explain how does the present disclosed example make the positions of the sampling particles correspond to the position of the target object. In this example, the number of the sampling particles is 5, the target object is foots of the user.

Please refer to FIG. 11A, the following robot 1 captures the first comparison image, and determines 5 sampling particles Q1-Q5 in the first comparison image randomly. Because the sampling particles Q1-Q5 are determined randomly, only the sampling particles Q3-Q5 belong to the target object (namely, foots of the user). Then, the following robot 1 configures the first comparison image as the reference image.

Then, as shown in FIG. 11B, the following robot 1 captures the second comparison image, determines the positions of the sampling particles Q1-Q5, calculates each predicted position of each sampling particle Q1-Q5, and moves according to the predicted positions.

Then, the re-sampling is executed. The following robot 1 generates the first difference image (as shown in FIG. 12A) according to the second comparison image and the current reference image (namely, the first comparison image). The following robot 1 determines each correct probability of each sampling particle Q1-Q5, deletes the sampling particle Q1 having the lowest correct probability (namely, it's possible that the sampling particle Q1 doesn't belong to the target object), and adds the new sampling particle Q6 around the sampling particle Q5 having the highest correct probability (namely, it's most possible that the sampling particle Q1 belongs to the target object). Thus, the re-sampling is completed (as shown in FIG. 11B). Then, the following robot 1 configures the second comparison image as the new reference image.

Then, as shown in FIG. 11C, the following robot 1 captures the third comparison image, determines the positions of the sampling particles Q2-Q6, calculates each predicted position of each sampling particle Q2-Q6, and moves according to the predicted positions.

Then, the re-sampling is executed again. The following robot 1 generates the second difference image (as shown in FIG. 12B) according to the third comparison image and the current reference image (namely, the second comparison image). The following robot 1 determines each correct probability of each sampling particle Q2-Q6, deletes the sampling particle Q2 having the lowest correct probability, and adds the new sampling particle Q7 around the sampling particle Q5 having the highest correct probability. Thus, the re-sampling is completed again (as shown in FIG. 11C). Then the following robot 1 configures the third comparison image as the new reference image.

Then, as shown in FIG. 11D, the following robot 1 captures the fourth comparison image, determines the positions of the sampling particles Q3-Q7, calculates each predicted position of each sampling particle Q3-Q7, and moves according to the predicted positions.

Then, the re-sampling is executed. The following robot 1 generates the third difference image (as shown in FIG. 12C) according to the fourth comparison image and the current reference image (namely, the third comparison image). The following robot 1 determines each correct probability of each sampling particle Q3-Q7, deletes the sampling particle Q6 having the lowest correct probability, and adds the new sampling particle Q8 around the sampling particle Q5 having the highest correct probability. Thus, the re-sampling is completed (as shown in FIG. 11D). Then, the following robot 1 configures the fourth comparison image as the new reference image.

The present disclosed example can effectively track the target object in images, and make the following robot 1 follow the target object effective.

The above mentioned are only preferred specific examples in the present disclosed example, and are not thence restrictive to the scope of claims of the disclosed example. Therefore, those who apply equivalent changes incorporating contents from the present disclosed example are included in the scope of this application, as stated herein.

What is claimed is:

1. A method of tracking target object for making a following robot follow a target object automatically, comprising following steps:
    a) capturing a target object for obtaining a comparison image at the following robot;
    b) determining a plurality of sampling particles corresponding to the target object from the comparison image;
    c) calculating a predicted position of each sampling particle according to a current position and a current velocity of each sampling particle;
    d) controlling the following robot to move toward a predicted direction corresponding to the predicted positions;
    e) re-sampling the sampling particles according to a difference between a reference image and the comparison image, and configuring the comparison image as the new reference image; and
    f) performing the step a) to the step e) repeatedly until the following robot stops following the target object.

2. The method of tracking target object according to claim 1, wherein the method of tracking target object comprises following steps after step a) and before step b):
    g1) calculating a body deviation according to the reference image and the comparison image; and
    g2) calibrating the comparison image according to the body deviation.

3. The method of tracking target object according to claim 2, wherein the step g1) comprises:
    g11) retrieving a reference position of image of a static physical object in the reference image;
    g12) recognizing a comparison position of image of the static physical object in the comparison image; and
    g13) calculating the body deviation according to the reference position and the comparison position.

4. The method of tracking target object according to claim 1, wherein the method of tracking target object comprises following steps after step a) and before step b):
    h1) executing a glare mask process on the comparison image for filtering a glare region in the comparison image out; and
    h2) executing a shadow mask process to the comparison image for filtering a shadow region in the comparison image out.

5. The method of tracking target object according to claim 1, wherein the step c) comprises following steps:
    c1) adding a random value to the current velocity as the new current velocity, wherein an initial value of the current velocity is zero; and
    c2) calculating the predicted position of each sampling particle according to the current position and the current velocity of each sampling particle and a capture time difference between time of capturing the reference image and time of capturing the comparison image.

6. The method of tracking target object according to claim 1, wherein the step e) comprises following steps:
    e1) comparing the reference image with the comparison image, and generating a difference image;
    e2) calculating a correct probability of each sampling particle belonging to the target object according to the difference image;
    e3) re-sampling the sampling particles according to the correct probabilities of the sampling particles; and
    e4) configuring the comparison image as the new reference image.

7. The method of tracking target object according to claim 6, wherein the comparison image comprises a plurality of difference pixels, the step e2) comprises following steps:
   e21) configuring a statistic region of each sampling particle in the difference image according to the current position of each sampling particle;
   e22) calculating a number of all pixels in the statistic region of each sampling particle for obtaining a region pixel amount of the statistic region of each sampling particle;
   e23) calculating a number of the difference pixels in the statistic region of each sampling particle for obtaining a region difference pixel amount of the statistic region of each sampling particle; and
   e24) calculating a ratio of the region difference pixel amount to the region pixel amount of the statistic region of each sampling particle, and making the ratio as the correct probability of the sampling particle.

8. The method of tracking target object according to claim 6, wherein the step e3) comprises following steps:
   e31) deleting the sampling particle which the correct probability is low; and
   e32) adding the sampling particle around the sampling particle which the correct probability is high.

9. The method of tracking target object according to claim 1, wherein the step d) comprises following steps:
   d1) controlling a revolution rate of a left drive wheel of the following robot to be less than a revolution rate of a right drive wheel of the following robot when the predicted positions of the sampling particles are located at left half of the comparison image; and
   d2) controlling the revolution rate of the right drive wheel of the following robot to be less than the revolution rate of the left drive wheel of the following robot when the predicted positions of the sampling particles are located at right half of the comparison image.

10. The method of tracking target object according to claim 1, wherein the method of tracking target object further comprises following steps:
    i1) sensing a current distance between the following robot and the target object via a distance-sensing module of the following robot; and
    i2) controlling the following robot to speed up for approaching the target object or decelerate for staying away from the target object according to the current distance when the predicted positions are located at a default region of the comparison image.

* * * * *